(12) United States Patent
Breckner et al.

(10) Patent No.: US 7,155,710 B2
(45) Date of Patent: Dec. 26, 2006

(54) METHOD AND APPARATUS FOR GAMING DEVICE SOFTWARE CONFIGURATION

(75) Inventors: Robert Breckner, Sparks, NV (US); Steven G. LeMay, Reno, NV (US)

(73) Assignee: IGT, Reno, NV (US)

( * ) Notice: Subject to any disclaimer, the term of this patent is extended or adjusted under 35 U.S.C. 154(b) by 377 days.

(21) Appl. No.: 09/877,991

(22) Filed: Jun. 8, 2001

(65) Prior Publication Data

US 2002/0188940 A1 Dec. 12, 2002

(51) Int. Cl.
*G06F 9/44* (2006.01)
*G06F 9/445* (2006.01)

(52) U.S. Cl. .................. 717/168; 717/169; 717/174; 717/175

(58) Field of Classification Search ......... 717/168–178
See application file for complete search history.

(56) References Cited

U.S. PATENT DOCUMENTS

| | | | | |
|---|---|---|---|---|
| 5,931,909 A | * | 8/1999 | Taylor | 717/177 |
| 5,966,715 A | * | 10/1999 | Sweeney et al. | 707/203 |
| 6,018,720 A | | 1/2000 | Fujimoto | 705/26 |
| 6,131,192 A | | 10/2000 | Henry | 717/175 |
| 6,167,562 A | | 12/2000 | Kaneko | 717/109 |
| 6,219,836 B1 | | 4/2001 | Wells et al. | 717/178 |
| 6,367,073 B1 | * | 4/2002 | Elledge | 717/178 |
| 6,675,382 B1 | * | 1/2004 | Foster | 717/177 |
| 6,692,361 B1 | * | 2/2004 | Itskov | 463/43 |

OTHER PUBLICATIONS

Author Unknown, "Joliet Specification for CD-Rom," Microsoft Support, 2 pgs., 2000.
Author Unknown, "Joliet Specification," Berkeley Education, 15 pgs., 1995.

* cited by examiner

*Primary Examiner*—Kakali Chaki
*Assistant Examiner*—William H. Wood
(74) *Attorney, Agent, or Firm*—Beyer Weaver & Thomas LLP (57) ABSTRACT

A method and apparatus for packaging, distributing, installing, deleting, or updating gaming software is disclosed. In one embodiment the method and apparatus of the invention identifies a plurality of files, which may exceed hundreds of files, to be distributed, installed, or provided as updates. The plurality of files are selected and processed into a reduced number of files, often a single file. The single file contains all of the plurality of files and is capable of being further processed to restore the plurality of files and the directory structure of the plurality of files.

12 Claims, 6 Drawing Sheets

METHOD AND APPARATUS FOR GAMING DEVICE SOFTWARE CONFIGURATION

FIELD OF THE INVENTION

The present invention relates to gaming machine software and in particular to a method and apparatus for gaming device software configuration and gaming device software distribution.

BACKGROUND OF THE INVENTION

Gaming devices, such as those found in a casino, often utilize software code to control operation of the gaming devices. In systems of the prior art, the software resided in an erasable programable read only memory (EPROM). The game control system interacts with the software stored on the EPROM to control game play. In general, games of the prior art are less complex than modern games. For example, prior art games did not include detailed and high resolution video based graphics, captivating sounds, or complex and lengthy software routines. Moreover, these software files that embodied the game were often small in size, often less than twenty megabytes. As a result, the devices such as EPROMs, which traditionally have limited storage capacity, were acceptable for use as a storage medium for the game software.

The gaming device was sold to a customer, such as a casino, with a game stored on the EPROM. The software files that enabled game play was first tranformed to binary data and loaded (burned) onto the EPROM, a complex task by itself, and then prior to shipment, the EPROM installed into a socket on an electronic circuit board in the gaming machine. The entire game software and data was contained on the EPROM. In some instances, numerous EPROMs were installed due to the storage limitations of an EPROM device.

Recently, casinos, game designers and programers have made strides to increase the appeal of electronic based casino games and to provide a more captivating experience for the gambler. These improvements include the addition of numerous sounds and images and more complex and enjoyable games. Some games even include multifaceted games that allow a successful player to advance to bonus rounds for an opportunity to win additional money or points.

Due to the advances in game technology and in particular the advances in gaming software, the prior art methods of assembling, distributing, and updating gaming software suffer from numerous disadvantages. Modern games and their associated software may consist of several thousands of files with each file being configured to interact to provide an advanced gaming experience to a gambler. Moreover, modern games and the associated presentation are significantly larger in size than prior art games and hence require more memory for storage.

In the prior art method, the binary game data was loaded onto one or more EPROMs. However, for modern games, the number of files has increased and the size of each file has increased and hence the prior art method has become overly burdensome. By way of example, when a game is initially installed on a gaming device, the prior art method of software storage and installation requires that each and every necessary game file be transformed into binary data and then copied to the EPROM. This is an undesirably complex and time consuming task. In addition, the limited storage capacity of each EPROM requires that an undesirably large number of EPROMs be used. Hence, the prior art method of configuring software on a gaming device is undesirable.

Another drawback to the prior art method of game storage concerns storage of the game software as binary data on the EPROM. The desired information in the binary data must be accessed using an offset from the beginning of the binary data. This adds complexity to the process of accessing game data. Moreover, tools must be developed or purchased to transform the game files into the binary data format for storage on the EPROM. This undesirable adds another layer of complexity and processing to game development and implementation.

At times electronic gaming devices may require a software update. The prior art method of updating software requires replacing the EPROMs that store the software code. This is undesirable for numerous reasons. To update a large game requires replacement of numerous EPROMs. Replacing numerous EPROMs is expensive in that the individual cost of EPROMs is not nominal and EPROM replacement requires skilled technicians. Another undesirable aspect to the prior art method is the time requirements and complexity of replacing such as large number of EPROM. EPROM removal and replacement is subject to pin bending, pin and socket breakage, or EPROM damage from electrical discharge. It should be noted that a single casino may have hundreds of gaming devices, each of which may require that numerous EPROM replacements.

One proposed solution has been to permanently install Flash memory instead of EPROMS as more data may be stored on a Flash memory. While this proposed solution provides the advantage of more storage capacity, it suffers from the added expense associated with Flash memory. Flash memory is prohibitively expensive and continues to suffer from size limitations. Moreover, use of flash memory is still plagued by the disadvantage of requiring software technicians to individually create and load the binary software data onto the Flash memory media and subsequently install a Flash memory card in each gaming device.

The drawbacks of the prior art are more pronounced when a gaming device is configured to store multiple games thereby allowing a game player or a gaming machine owner, such as a casino, to select between multiple games for play. The software files for each game may number into the hundreds thereby exacerbating the above-described prior art problems.

Therefore, a need exists for a method and apparatus to accurately and efficiently install, track, and update game software.

SUMMARY OF THE INVENTION

The invention overcomes the problems associated with the prior art by providing a method and apparatus for gaming software assembly, configuration, distribution and installation. In one embodiment of the invention a plurality of software files are grouped together on a single media in one or more files. It is contemplated that the one or more files are fewer in number than the plurality of software files. Hence, the grouping of the plurality of software files into a reduced number of one or more files provides advantages for grouping of software or data files, distribution, installation, deletion, or updating. Other advantages may be realized by those of ordinary skill in the art.

In one embodiment a plurality of software files, such as game files, may exist on a fixed media, such as a hard disk drive. It is desired to distribute or group these files. Various reasons may exist for distributing or grouping these files. For example, it may be desired to group these files into a reduced number of files, or a single file, to more accurately and more easily send the group of files to other individuals or for purposes of installation at a remote site. By manipulating the group of files into a reduced number of files, the files may be more easily tracked, monitored, or installed.

Similarly, if it is desired to delete a plurality of files from a machine or device, the plurality of files to be deleted may be grouped into a reduced number of files and the reduced number of files may be deleted or manipulated as desired. In one embodiment the plurality of files is reduced to a single file.

These advantages are particularly desirable when the number of files increases. In some situations it is necessary to manipulate, distribute, install or delete hundreds of files and establish numerous different directories or subdirectories for the files. By grouping the files into a reduced number of files, the processes are more easily, more rapidly and more accurately achieved. Another desirable aspect of the invention is that the process of performing the distribution, installation, deletion or the like may occur by a more diverse group of individuals. For example, the invention allows less skilled or less highly trained individuals to carry out the game install or update process.

In one method of operation a plurality of software files and any designated directory structure are grouped or combined into a single file configured under the ISO9660 file standard. The created ISO9660/Joliet file contains the files and directory structure in a single file. The single ISO9660/Joliet file may then be distributed, installed, deleted, or otherwise manipulated as desired. The term software or files as used herein is defined broadly to mean any type of data or information stored in electronic format including but not limited to data files, image files, video files, sound files, computer readable software code and signatures files such as those used for authentication. The ISO9660/Joliet type file is but one possible format or standard to utilize when creating the reduced number of files from the plurality of files. It is contemplated that any other type of operation having similar results that is currently known or developed in the future may be adopted for use.

It is contemplated the invention be executed by computer hardware including a processor, a storage media, and user interface. It is contemplated that the created ISO9660/Joliet file be stored on a fixed media, such as a hard drive, or output to a removable media, such as CD-ROM, or to a network interface for transmission over a network. Compression or encryption may be implemented as desired.

Further objects, features, and advantages of the present invention over the prior art will become apparent from the detailed description of the drawings which follows, when considered with the attached figures.

DETAILED DESCRIPTION OF THE INVENTION

The invention is a method and apparatus for game software configuration, installation, tracking, or updating. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

The invention overcomes the disadvantages of the prior art by providing a method and apparatus for accurately and efficiently tracking, storing, and updating gaming files. In general and in accordance with the invention, the plurality of software files that comprise a game are assembled into one or more combined files or images. The term image is used broadly herein to mean a compilation or assembly of two or more files into a single file. In alternative embodiments, the assembly of two or more files or directories may be combined into a container or folder. The container is thus structured to include a plurality of files. The single image file, which is comprised of the plurality of files that comprise the game or facilitate operation of a gaming device, is more easily tracked, stored, updated, distributed, identified, deleted and accounted for as compared to attempting to perform these functions on the plurality of the individual files.

Figure 1:
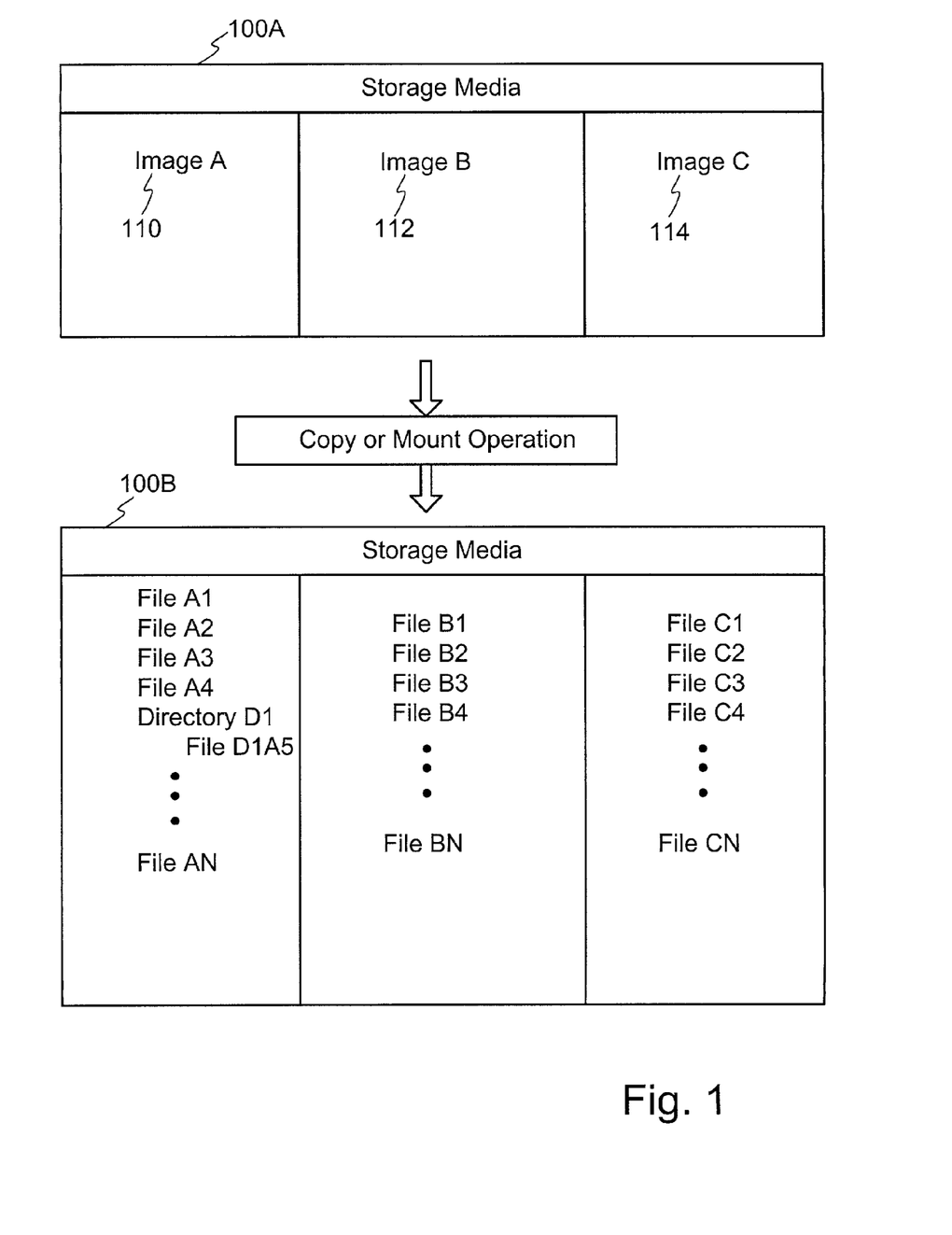
FIG. 1 is a block diagram of an example process of one embodiment of the invention.

FIG. 1 illustrates a block diagram of software on one or more storage media. As shown, a first storage media 100A includes a first image file 110, a second image file 112, and a third image file 114. The storage media may comprise any type of media capable of storing digital data. In various different embodiments, the storage media may comprise, but is not limited to, hard disk drive, CD-ROM, DVD-ROM, tape memory, EPROM, flash memory, RAM, ROM, zip disk, or floppy drive.

The image files 110, 112, 114 comprise a compilation of a plurality of other files. For example, the software portion of a modern game may comprise hundreds of different files. The image files 110, 112, 114 thus comprise a single file containing each of the files that comprise the game software. As can be readily understood, a single file is easier to work with, track, distribute, and delete than each individual game file, that may number into the hundreds.

The image file may comprise any type of file capable of uniting a plurality of the files and/or directory structures and which may optionally be extracted to generate the plurality of files at a later time. In various embodiments, the image file comprises a file created in accordance with the ISO 9660 or Joliet file standard, the LZH (Lempel-Ziv and Haruyasu) file standard, TAR format, or the ZIP file standard. It is contemplated that other file standards or methods may be adopted for use to link or otherwise associate a plurality of files into fewer files to create a more manageable number of files.

After the image files 110, 112, and 114 are created, one or more of the images may be copied or mounted onto a second media 100B or a file system may be made available to other media. The second media 100B may comprise the same media at the storage media 100A, a different section of the media 100A, or an entirely different media than media 100A. The second media 100B may be located in the same gaming device as the first storage media 100A or located remote from the first storage media and accessed via a remote communication link, such as a computer network. If a file system is established, then it may be established on any media and made available, such as by mapping, to be accessed from other locations. Hence the exact storage media is not critical, but it is understood that access is provided to a file system and the image is stored or associated with an accessible file system.

As is shown the one or more image files 110, 112, 114 undergo a copy or mount operation 120 once on a file system, which may be located on any storage media. This operation processes the image file and extracts, expands, or otherwise creates a plurality of files and directories based on the information contained in the image file. Thus, with regard to Image A110, the mount operation create a plurality of files, FileA1 through FileAN, where N comprises any positive integer. Various directories may also be created, such as directory D1 and files D1A5 in directory D1.

This process may be repeated with different image files to create additional collections of files on any storage media. For example, Image B112 may be processed or mounted to create FileB1 through FileBN, and Image C114 may be processed or mounted to create FileC1 through FileCN. N comprises any positive integer. Various directories may also be created. It is contemplated that a mount point or other location be provided to specify where and in what manner the image files 110, 112, 114 are processed and finally located.

It is contemplated that compression, authentication, or verification, (for example CRC, checksum) may occur on each of the files that comprises the image file prior to creation of the image file. Alternatively, compression, authentication, or verification may be performed on an image file after the image file is created. In alternative embodiments, compression, authentication, or verification is performed on each file before creation of the image file and on the image file after creation of the image file. Of course, the invention does not require compression.

In accordance with the often stringent and necessary security requirements associated with casino gaming, it is contemplated that each file that comprises the image file may be encrypted prior to creation of the image file. Alternatively, encryption may be performed on an image file after the image file is created. In alternative embodiment, encryption is performed on each file before creation of the image file and on the image file after creation of the image file. Of course, the invention does not require encryption.

Figure 2:
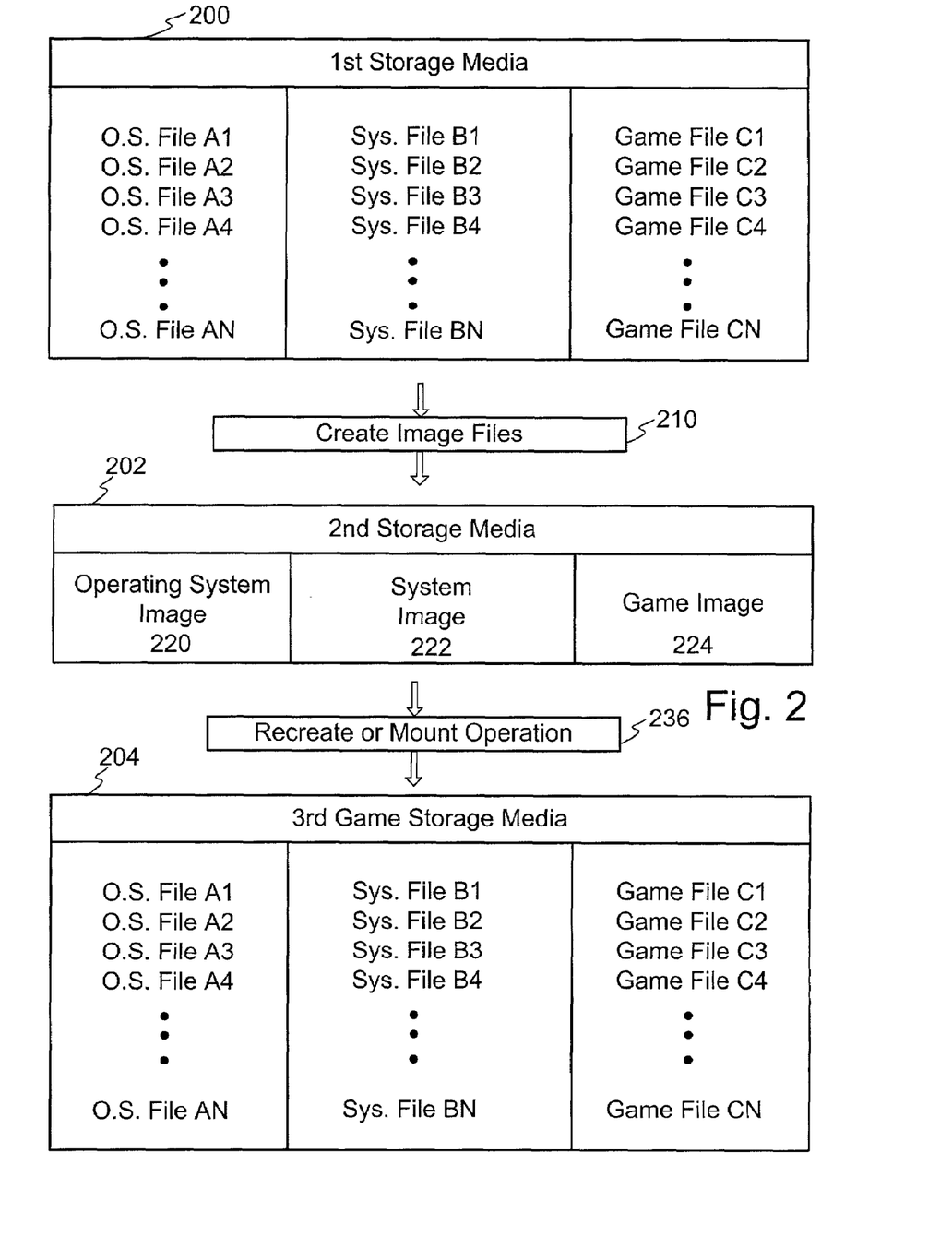
FIG. 2 is a block diagram of another example process of one embodiment of the invention exemplary software on one or more media.

FIG. 2 illustrates a block diagram of exemplary software on one or more media. Although this exemplary embodiment is described in terms of three types of files and a particular method of operation, the invention should not be considered to be limited to the example embodiment of FIG. 2. A first storage media 200 stores files of various types including, in this example embodiment, operating system files O.S. File A1 through O.S. File AN, where N comprises any positive integer. The O.S. files comprise operating system files as those of ordinary skill in the art understand to oversee and enable operation of hardware and software of a computer system.

The first storage media 200 also stores Sys. File B1 through Sys. File BN, where N comprises any positive integer. Sys. File type files comprise system files that control gaming machine specific hardware and resource management, such as, but not limited to memory control, data collection, and data storage. Examples of system files include but are not limited to various system drivers such as for a hopper driver or a coin acceptor driver.

The first storage media 200 also stores Game File C1 through Game File CN, where N comprises any positive integer. Game File type files comprise software files that enable and control game play on a gaming machine.

In one example embodiment the first storage media comprises storage media of a game development or game distribution entity. In this environment the operating system files, the system files, and the game files are viewed, edited, and tested by numerous personnel including software programmers, artists, regulatory personnel, and others. In addition, there may exist hundreds of each type of file and various files may be passed around the network to various personnel, during the creation of these files. Numerous different versions of each file may exist.

As a result, it is difficult to track the various files and determine which is the final version. This problem plagues each file type throughout the distribution and installation process. As a solution to this problem, the invention creates an image file at a step 210 for each type of file. Hence, all the operating system files (O.S. Files) are processed into an O.S. image 220 and stored on a second storage media 202 or access to a file system having the O.S. image stored thereon is created. In one embodiment the second storage media comprises a CD-ROM type memory or other removable media. Access to a file system may be made over a computer network.

Similarly, the system files are processed into a system image 222 and the games files are processed into a game image 224. In this manner the plurality of files may more easily be tracked, installed, distributed, and updated. The term image is used herein as meaning any file that contains information capable of being processed into two or more other files or directories. One example method of creating an image type file is provided in the Neutrino operating system available from QNX Software Systems, Ltd. In another embodiment image files may be created using software operating on a Microsoft windows platform, such as for example Easy CD Creator available from Adaptec. One type of image type files is created in accordance with the ISO9660/Joliet file standard for CD-ROM media. Other types of image type files may be created in accordance with the ZIP standard, the TAR format or the LZH standard.

After creation and storage of the one or more image files 220, 222, 224, on the second storage media 202, the second storage media may be easily distributed or the files more easily tracked. In one embodiment the second storage media 202 comprises a removable media and hence the system image, the operating system image and the game image may be easily distributed for install or update. Use of the image files within a company or other entity, is also aided by the use of a single image file. Alternatively or in addition, access to the image files may occur by granting access to a file system, such as over a network link, that contains the image files. The image files may subsequently be processed to provide access to the files that comprise the image file.

After distribution the one or more image files 220, 222, 224 may selectively be processed to recreate the plurality of files and directories as was complied into the image file. This occurs at a step 236. In one embodiment this comprises a mount operation such as available in the Nutrinio operating system and Unix operating system. In the example environment the mount operation occurs to recreate the plurality of each type of file on to a third storage media 204. In one embodiment the third storage media comprises a hard disk drive or flash memory. The third storage media may be installed in a gaming device and capable of receiving information from the second storage device 202. The recreate or mount operation, when provided a mount point for an image file 220, 222, 224, processes the image file to create on the third media 204 the files and directory structure that were on the selected portions of the first storage media ad selected for creation into the image file. In one embodiment the single files are copied from media 202 to media 204 and then mounted. In this manner the desired file structure is created on the third storage media 204 while gaining the advantages of distribution and install of a single file. In an alternative embodiment, the files may not be mounted or copied to a third media, but instead a file system is made accessible to another media and the file or image is remotely mounted through the network to provide access from a local file system.

Of course this is but one exemplary configurations and associated method of operation of the present invention. Other configuration and methods of operation are anticipated by the inventors and should be considered to be covered by the scope of the claims below.

Figure 3:
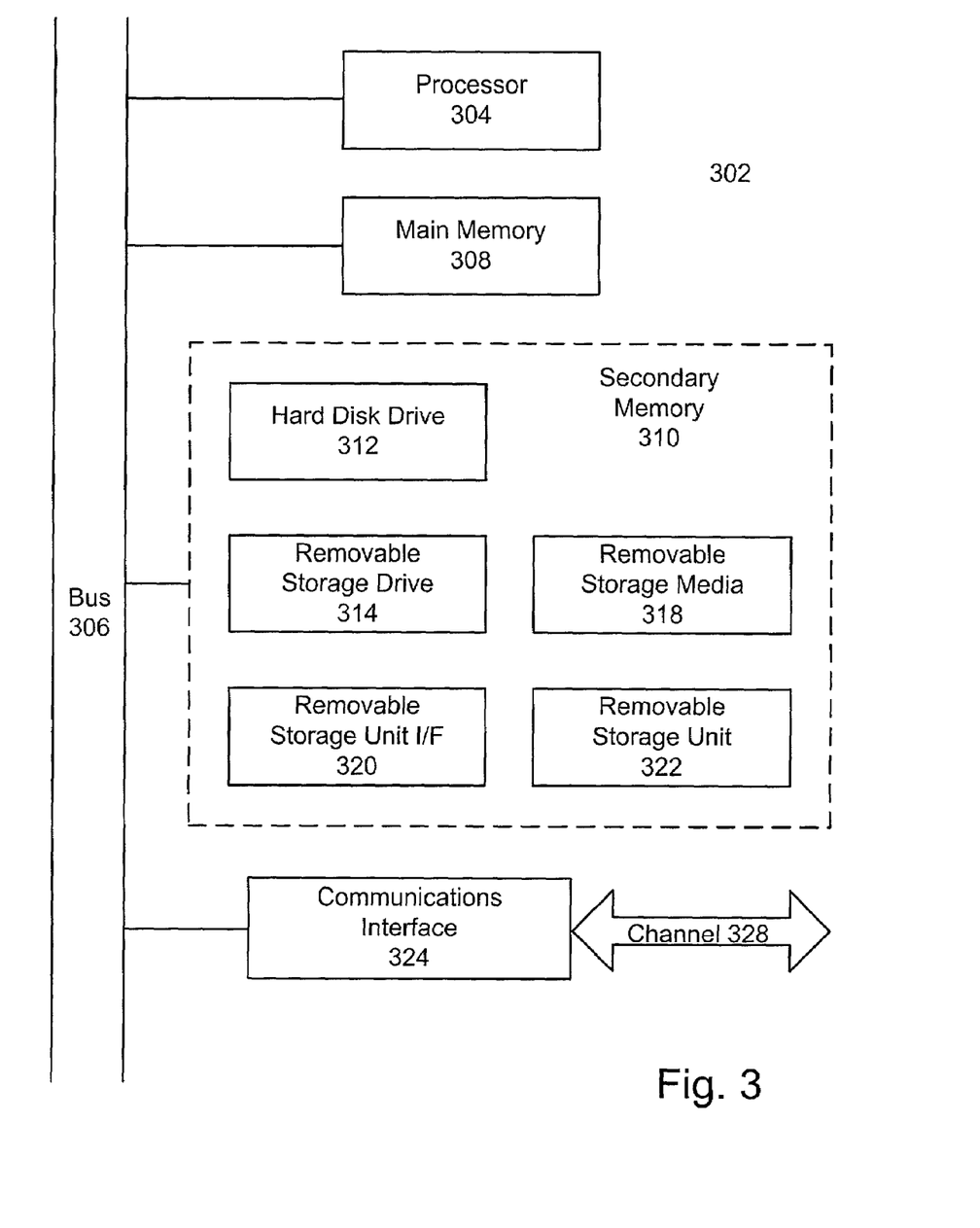
FIG. 3 illustrates an example embodiment of the invention.

The various embodiments, aspects and features of the invention described above may be implemented using hardware, software or a combination thereof and may be implemented using a computing system having one or more processors. In fact, in one embodiment, these elements are implemented using a processor-based system capable of carrying out the functionality described with respect thereto. An example processor-based system 302 is shown in FIG. 3 according to one embodiment of the invention. The computer system 302 includes one or more processors, such as processor 304. The processor 304 is connected to a communication bus 306. Various software embodiments are described in terms of this example computer system. The embodiments, features and functionality of the invention as described above are not dependent on a particular computer system or processor architecture or on a particular operating system. In fact, after reading this document, it will become apparent to a person of ordinary skill in the relevant art how to implement the invention using other computer or processor systems and/or architectures.

Processor-based system 302 can include a main memory 308, preferably random access memory (RAM), and can also include a secondary memory 310. The secondary memory 310 can include, for example, a hard disk drive 312 and/or a removable storage drive 314, representing a floppy disk drive, a magnetic tape drive, an optical disk drive, etc. The removable storage drive 314 reads from and/or writes to a removable storage medium 318 in a well known manner. Removable storage media 318, represents a floppy disk, magnetic tape, optical disk, etc. which is read by and written to by removable storage drive 314. As will be appreciated, the removable storage media 318 includes a computer usable storage medium having stored therein computer software and/or data.

In alternative embodiments, secondary memory 310 may include other similar means for allowing computer programs or other instructions to be loaded into computer system 302. Such means can include, for example, a removable storage unit 322 and an interface 320. Examples of such can include a program cartridge and cartridge interface (such as that found in video game devices), a removable memory chip (such as an EPROM, or PROM) and associated socket, and other removable storage units 322 and interfaces 320 which allow software and data to be transferred from the removable storage unit 318 to computer system 302.

Computer system 302 can also include a communications interface 324. Communications interface 324 allows software and data to be transferred between computer system 302 and external devices. Examples of communications interface 324 can include a modem, a network interface (such as, for example, an Ethernet card), a communications port, a PCMCIA slot and card, etc. Software and data transferred via communications interface 324 are in the form of signals which can be electronic, electromagnetic, optical or other signals capable of being received by communications interface. These signals are provided to communications interface via a channel 328. This channel 328 carries signals and can be implemented using a wireless medium, wire or cable, fiber optics, or other communications medium. Some examples of a channel can include a phone line, a cellular phone link, an RF link, a network interface, and other communications channels.

In this document, the terms "computer program medium" and "computer usable medium" are used to generally refer to media such as removable storage device 318, a disk capable of installation in disk drive 312, and signals on channel 328. These computer program products are means for providing software or program instructions to computer system 302.

Computer programs (also called computer control logic) are stored in main memory 308 and/or secondary memory 310. Computer programs can also be received via communications interface 324. Such computer programs, when executed, enable the computer system 302 to perform the features of the present invention as discussed herein. In particular, the computer programs, when executed, enable the processor 304 to perform the features of the present invention. Accordingly, such computer programs represent controllers of the computer system 302.

In an embodiment where the elements are implemented using software, the software may be stored in, or transmitted via, a computer program product and loaded into computer system 302 using removable storage drive 314, hard drive 312 or communications interface 324. The control logic (software), when executed by the processor 304, causes the processor 304 to perform the functions of the invention as described herein.

In another embodiment, the elements are implemented primarily in hardware using, for example, hardware components such as PALs, application specific integrated circuits (ASICs) or other hardware components. Implementation of a hardware state machine so as to perform the functions described herein will be apparent to persons skilled in the relevant art(s). In yet another embodiment, elements are implemented using a combination of both hardware and software.

In an embodiment where the elements are implemented using software, the software may be stored in, or transmitted via, a computer program product and loaded into computer system 302 using removable storage drive 314, hard drive 312 or communications interface 324. The control logic (software), when executed by the processor 304, causes the processor 304 to perform the functions of the invention as described herein.

Figure 4:
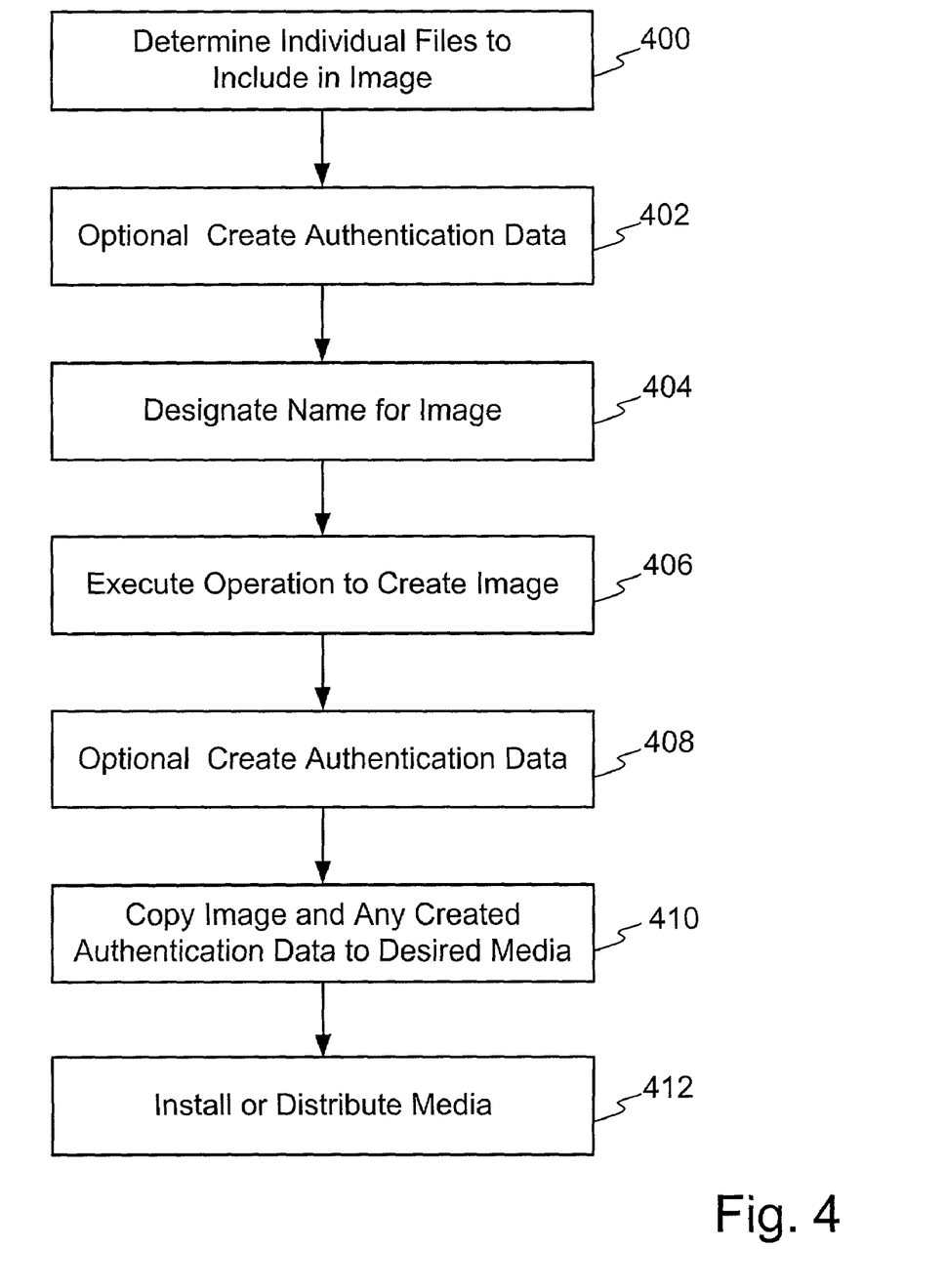
FIG. 4 illustrates an operational flow diagram of an exemplary method of creating an image file for use in a gaming environment.

In operation, the invention can be configured for various methods of use. FIG. 4 illustrates an example method of operation for creation of an image file. At a step 400 the operation determines which individual files to include in the image. In one method, a computer programer or computer technician, such as someone knowledgeable regarding the content and assembly of the files that are required or desired to be distributed and installed as the image. Next, at a step 402, the operation may optionally create authentication data regarding each of the individual files that are to be formed into the single image file. Hence, the authentication data is created and may be stored into an authentication file or files. The authentication file may then be included as one of the files that will comprise the image file. The authentication data may be created in accordance with the processes described in co-pending application Ser. No. 09/643,388.

Thereafter, at a step 404, the operation designates a name for the image file. In one embodiment an individual executing software commands selects a name for the image based on the content of the image file. At a step 406, the operation performs processing to create the image file. In one embodiment the image file is created by Easy CD Creator or Direct CD Creator by Adaptec. In another embodiment the image file is created by any software capable of producing an ISO 9600 or Joliet type image.

At a step 408, authentication data may optionally be created for the image file. A method of creating authentication data for one or more files is provided above. Hence, to provide additional levels of security, the individuals files may undergo an authentication process and the image file may undergo an authentication process.

At a step 410, the image may be copied to another media and any created authentication data being stored with the image file on the other media. In one embodiment the image file is created on the same media, such as a hard disk drive, as the individual files and thereafter the image file is copied to a removable media, such as a CD-ROM or DVD-ROM.

At a step 412, the image file, stored on a media, may be installed or distributed. Distribution may occur via a network, Internet, or through a removable media such as a ROM, RAM, CD-ROM, DVD-ROM, or any other removable storage.

In another or associated method of operation, the one or more image files may be utilized to distribute and/or install software onto media, such as a media that is found in a gaming machine. Use of a single image file insures that each and every file that is desired or required for operation is loaded onto the machine. It is far easier and more accurate to install a single file than to attempt to install hundreds of different files in a variety of directories. In addition, a single image file may be more easily distributed to individuals within a company or to customers than attempting to distribute hundreds or different files. In addition it is easier and less complex to download from a remote location or server a single file rather than hundreds or thousands of files.

Figure 5:
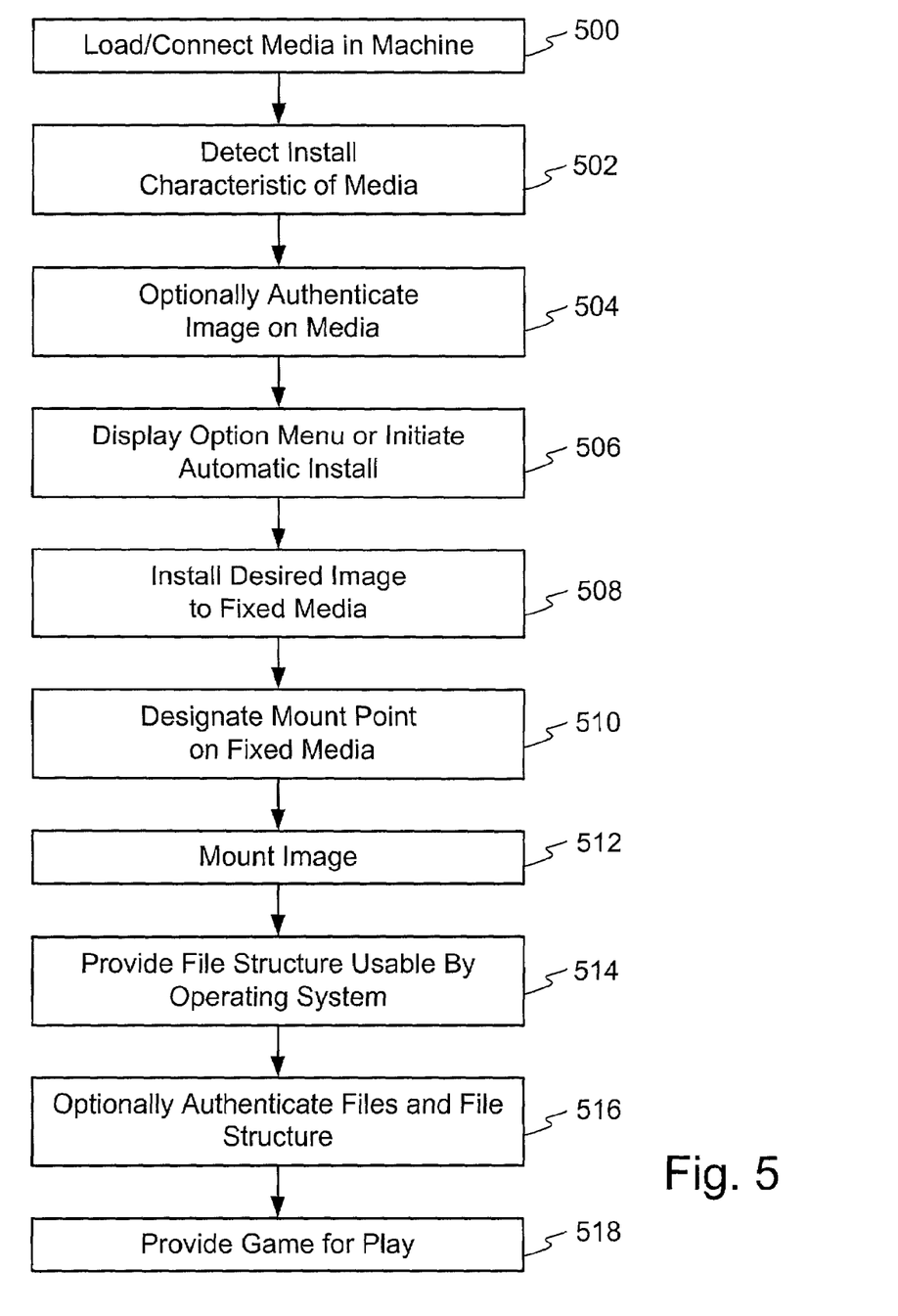
FIG. 5 illustrates an operational flow diagram of an exemplary method of installing and mounting an image file for use in a gaming environment.

In reference to FIG. 5, at a step 500 the media is loaded or connected to the machine onto which the image file is to be copied, loaded, or mounted. In one embodiment this comprises loading a removable media, such as a ROM or RAM disk into the removable media reader. In another embodiment this step comprises connecting the gaming machine to or in communication with a computer network or a central computer to thereby facilitate copying of the image file over a network link.

At a step 502, the operation detects the installation characteristics of the media. This step comprises determining that the media is intended to install software onto the gaming machine media. At a step 504, having determined that the media contains software or data to be installed, the operation optionally authenticates the image file on the media before, after or in conjunction with the installation of the image file on the media. At this step the entire image file may undergo an authentication process in the manner described above in co-pending application Ser. No. 09/643,388.

After authentication, the operation advances to a step 506 wherein the operation may display an option menu or automatically initiate installation of the image file. The option menu provides means for a computer technician or other individual to select from a plurality of image files to install on a machine or other device. After an option menu or install option is presented, at a step 508, the operation installs the desired image onto the fixed media of the machine, such as a gaming machine. In alternative embodiments the install or update files may remain on the removable media and the mount operation be executed on the file in the removable media.

After or during the image file install process, the operation, at a step 510, may request or be provided with a mount point on the fixed media at which to mount the image. The term mount should be understood to mean the process of extracting or obtaining the information from the image file to provide the files that were formed into the image file. In one embodiment the image file comprises a file created according to the ISO standard or the ISO9660/Joliet standard. These files are thus mounted at a mount point on the fixed media to reveal each file and directory contained in the image file and make the files accessible and readable to the operating system of the gaming device. After a mount point is designated, the image files is mounted at the designated mount point.

At step 514, and as a general result of the mount operation, the files structure is provided and is thus usable by the operating system or other files, programs, or software. After the image file is expanded so that the individual files of the image file are accessible, the operation may, at a step 516, perform authentication on each of the files of the image file. In one embodiment an authentication file containing authentication data is created based on each of the files that comprised the image file. This authentication file may be incorporated into the image file, with the other files in image, and thus conveniently be available when the image is expanded, extracted, or mounted. The authentication file does not have to be made a part of the image file. The information in the authentication file may be used to verify that the image file or the files of the image file have not been tampered with or that security has been breached. The authentication that occurs after the mount process of step 512 may occur instead of or in addition to the authentication of step 504. At a step 518, the software is available for use. In one embodiment the software comprises game software. In other embodiment the software comprises operating system software. In yet another embodiment the software comprises system software.

In another exemplary method of operation, the image file may be used to update existing software on a gaming machine or other computerized device. Updating software in accordance with the invention provides the advantages of having to only distribute a single file and/or having to only install a single file. In alternative methods of operation the invention may be configured to distribute multiple files and combine the files into one file once the multiple files are installed. For example, if the image file did not fit or was divided between multiple CD's then a numerous files may be installed and a single file created. As an advantage over the prior art, the invention is able to delete, replace, or update files by using a single image file instead of individually deleting, replacing, or updating one or more of hundreds of files.

Figure 6:
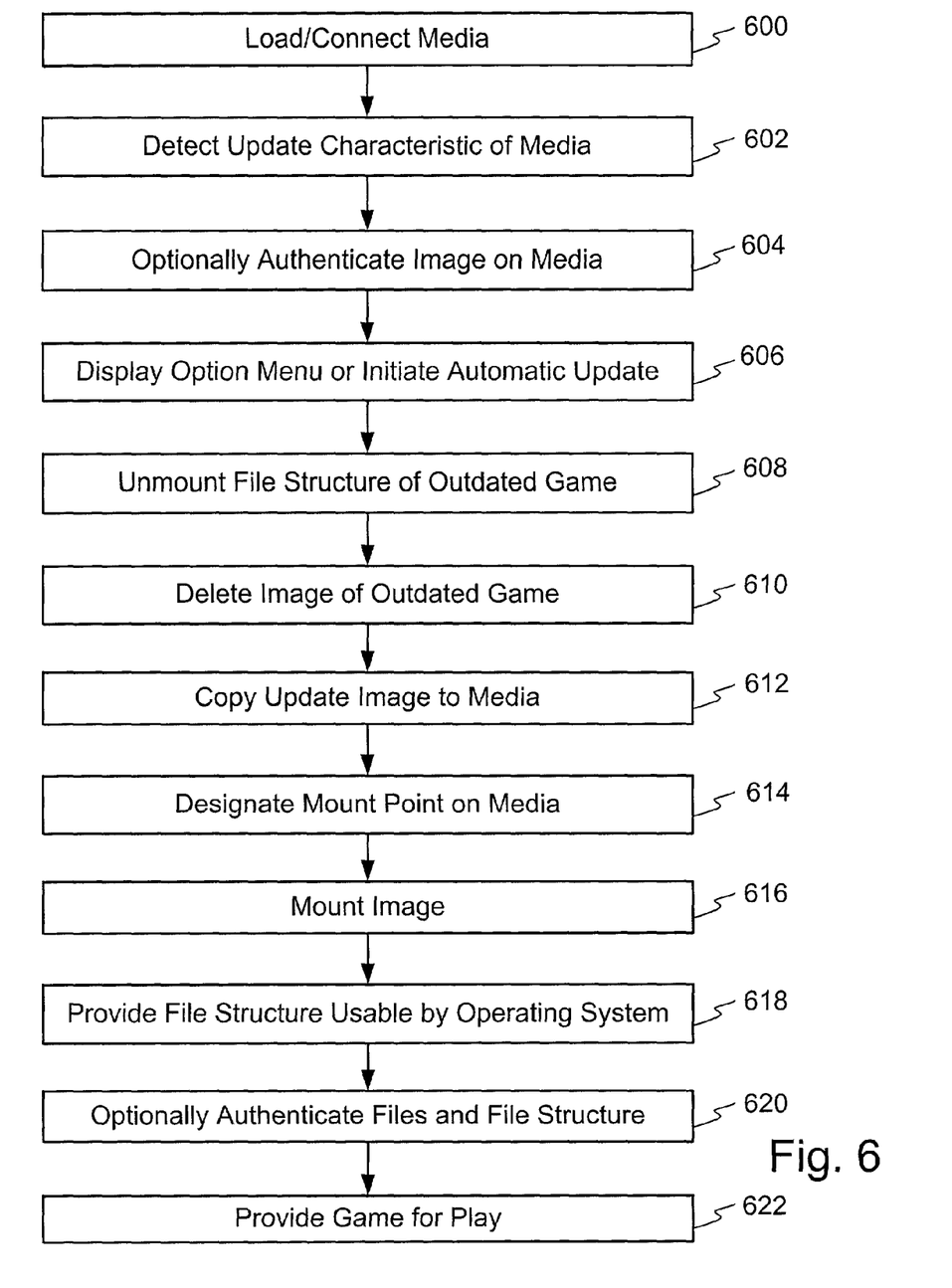
FIG. 6 illustrates an operational flow diagram of an exemplary method of updating game files in a gaming environment.

FIG. 6 illustrates an operational flow diagram of an example method of updating software in accordance with the principles of the invention. At a step 600 a removable media is loaded into a removable media reader of the gaming device or the gaming device connects to a media over a network link. Thereafter, at a step 602, the system detects the characteristic of the media and the software to be installed. In this example method of operation, the media is for updating existing software or code on the gaming device or other media.

At a step 604, the operation may optionally perform authentication of the image file stored on the removable media or at a remote location over a network link. Authentication performed on the image file guarantees that the image file has not been tampered with or altered. It is contemplated that an authentication file containing authentication or verification information may be associated with the image file. This authentication file contains information regarding the contents of the image file and can be processed to determine if the image file has been altered. An exemplary method of authentication is referenced above.

At a step 606, the system may display an options menu or automatically initiate the update procedure described below. It is contemplated that option menu may require password entry to continue operation. It is also contemplated that the option menu allows the system to provide the option for a computer technician to select which software is updated or which update software to install on the gaming machine. For example, the update may be directed to game software, system software or operating software. Similarly, the menu may provide the computer technician the option to update one or more of several different games, system files, or operating system files. If presented with an option menu, it is assumed that the computer technician will select an option. In one embodiment the install process may be controlled by one or more keys or apparatus. One example comprises a USB (universal serial bus) key obtained by license procedures.

Next, at step 608, the operation un-mounts the files structure of the software that is to be updated. In one embodiment this comprises compiling, collecting, or forming the files of a game into an image file, such as a recreation of the file image that was initially mounted onto the media when the game was installed and mounted. This provides the advantage of collecting all the game files into a single file. Next, at a step 610 the newly created image file, composed of the software to be updated, is deleted. Thus, all the software that is to be updated or replaced is easily deleted as it is all contained in the newly created image file.

At a step 612, the operation copies the update image to the media of the gaming machine. In one embodiment the gaming machine media is a hard disk drive. The update image contains the updated software packaged into a single file, such as an image file. After the image file is copied, a mount point for the image is designated at a step 614. Designating a mount point provide the location on the media where the files structure specified by the image file is to be located and mounted. The image file may be copied from a removable media or a network or other communication link.

At a step 616, the image file is mounted at the designated mount spot. At a step 618, the file structure and files are provided for use by various other systems or software on the gaming machine. Thereafter, at a step 620, the operation may optionally authenticate the files and file structure made available by the mount operation of step 616 and 618 on the image file. Authentication after mounting the file provides another level of security and verification that the files expanded from the image file have not been tampered with or altered. This step of authentication is in addition to the authentication that may optionally occur at step 604.

At a step 622 the game may be provided for play. In other embodiments the software being updated through the use of an image file is other than game software, such as operating system software or system software. In yet another embodiment the operation returns to the menu screen of step 606 to present a computer technician or installer to the option menu.

It will be understood that the above described arrangements of apparatus and the method therefrom are merely illustrative of applications of the principles of this invention and many other embodiments and modifications may be made without departing from the spirit and scope of the invention as defined in the claims.

It will be understood that the above described arrangements of apparatus and the method therefrom are merely illustrative of applications of the principles of this invention and many other embodiments and modifications may be made without departing from the spirit and scope of the invention as defined in the claims.

We claim:

1. A method for preparing a plurality of software files for installation on a gaming device, the method comprising:
   grouping the plurality of software files into three separate image files consisting of an operating system image file, a control system image file and a game image file;
   specifying all operating system files in the plurality of software files to be included in the operating system image file, control system and game files in the plurality of software files not included in the operating system image file;
   specifying all control system files in the plurality of software files to be included in the control system image file, operating system and game files in the plurality of software files not included in the control system image file;
   specifying all game files in the plurality of software files to included in the game image file, operating system and control system files in the plurality of software files not included in the game image file;
   creating the operating system image file, the control system image file and the game image file;
   copying the operating system, control system and game image files to a media accessible from a gaming device; and
   specifying separate mount points for each of the operating system, control system and game image files;
   the files of each of said image files being extractable at the respective separate mount points to cause the files of each of said image files to be available for use by the gaming device.

2. The method of claim 1, wherein the media comprises a hard disk drive.

3. The method of claim 1, wherein copying comprises copying over a computer network.

4. The method of claim 1, wherein each of the image files comprises a single file having a configuration based on a format selected of the group consisting of LZH format, ZIP format, and the TAR format.

5. A method for preparing software files for use in conjunction with a game system for distribution and distributing the software files, the method comprising:

grouping the software files into three separate compilation files consisting of an operating system compilation file, a control system compilation file and a game compilation file;

collecting all operating system software files into the operating system compilation file, control system and game software files not collected in the operating system compilation file;

collecting all control system software files into the control system compilation file, operating system and game software files not collected in the control system compilation file;

collecting all game software files into the game compilation files, operating system and control system software files not collected in the game compilation file;

designating separate mount points for each compilation file on a storage media of the game system; and sending the operating system, control system and game compilation files to the storage media of the game system;

the operating system, control system and game compilation files being expandable on the storage media of the game system, whereby expanding said compilation files creates all of the collected software files on the storage media of the game system.

6. The method of claim 5, wherein the game system comprises a central computer configured to interface with a plurality of gaming devices.

7. The method of claim 5, wherein the compilation files comprises one file created according to the ISO 9660/Joliet file standard.

8. The method of claim 5, wherein sending comprises transporting a CD-ROM disc.

9. A computer program product comprising a computer useable medium having computer program logic stored thereon for providing gaming software comprising:

computer program code logic for the gaming software grouped into three files consisting of an operating system image file, a control system image file and a game image file, the operating system image file including all operating system files but not control system and game files, the control system image file including all control system files but not operating system and game files, and the game system image file including all game files but not operating system and control system files, the image files each capable of being separately processed to restore the operating system, control system and game files respectively; and computer program code logic configured to process the image files to thereby restore the plurality of operating system, control system, and gaming files respectively packaged as the operating system image, control system image and gaming image files, the computer code logic designating separate mount points for each of said image files.

10. The computer program code logic of claim 9, further including computer program code logic configured to copy the image files onto a fixed media in a gaming machine.

11. The computer program code logic of claim 9, wherein the image files each comprise a Joliet type file or a ISO 9660 type file.

12. The computer program code logic of claim 9, wherein the plurality of gaming files comprise a game involving wagering.

* * * * *